US009753583B2

(12) United States Patent
Hong et al.

(10) Patent No.: US 9,753,583 B2
(45) Date of Patent: Sep. 5, 2017

(54) METHOD OF SCANNING TOUCH PANEL AND TOUCH INTEGRATED CIRCUIT FOR PERFORMING THE SAME

(71) Applicant: Dongbu Hitek Co., Ltd., Seoul (KR)

(72) Inventors: Won Cheol Hong, Seoul (KR); Joon Song, Seoul (KR); Young Wook Kim, Seoul (KR); Jin Ah Lee, Incheon (KR)

(73) Assignee: DONGBU HITEK CO., LTD., Seoul (KR)

( * ) Notice: Subject to any disclaimer, the term of this patent is extended or adjusted under 35 U.S.C. 154(b) by 65 days.

(21) Appl. No.: 14/802,786

(22) Filed: Jul. 17, 2015

(65) Prior Publication Data

US 2016/0062547 A1 Mar. 3, 2016

(30) Foreign Application Priority Data

Aug. 29, 2014 (KR) .................... 10-2014-0113716

(51) Int. Cl.
| G06F 3/045 | (2006.01) |
| G06F 3/041 | (2006.01) |
| G05B 15/02 | (2006.01) |
| G06F 3/044 | (2006.01) |

(52) U.S. Cl.
CPC .......... *G06F 3/0418* (2013.01); *G05B 15/02* (2013.01); *G06F 3/0416* (2013.01); *G06F 3/044* (2013.01)

(58) Field of Classification Search
CPC ..................... G06F 3/041–3/047; G06F 3/044
See application file for complete search history.

(56) References Cited

U.S. PATENT DOCUMENTS

| 2010/0327881 | A1* | 12/2010 | Chang ..................... G06F 3/044 324/658 |
| 2014/0104208 | A1 | 4/2014 | Lee et al. |
| 2014/0240282 | A1 | 8/2014 | Hwang |
| 2014/0375595 | A1* | 12/2014 | Lin ........................ G06F 3/044 345/174 |
| 2015/0277621 | A1* | 10/2015 | Roberson ................ G06F 3/044 345/174 |

FOREIGN PATENT DOCUMENTS

| KR | 1020130021574 | 3/2013 |
| KR | 1020140081196 A | 7/2014 |
| KR | 1020140087989 A | 7/2014 |

OTHER PUBLICATIONS

Korean Office Action, for Application No. 10-2014-0113716, dated May 30, 2016, 6 pages.
Taiwanese Office Action, for Application No. 104125497, dated Apr. 22, 2016, pages.

* cited by examiner

*Primary Examiner* — Hang Lin
(74) *Attorney, Agent, or Firm* — Patterson Thuente Pedersen, P.A.

(57) ABSTRACT

According to embodiments, methods of scanning a touch panel and a touch integrated circuit (IC) for performing the same are disclosed. The touch IC simultaneously supplies a first driving signal having a first phase and a second driving signal having a second phase to a first driving line and a second driving line of the touch panel, respectively, and detects a sensing signal from a sensing line crossing the first driving line and the second driving line. The touch IC acquires a first scanning signal corresponding to the first driving line and a second scanning signal corresponding to the second driving line from the sensing signal.

16 Claims, 4 Drawing Sheets

METHOD OF SCANNING TOUCH PANEL AND TOUCH INTEGRATED CIRCUIT FOR PERFORMING THE SAME

CROSS-REFERENCE TO RELATED APPLICATION

This application claims to the benefit of Korean Patent Application No. 10-2014-0113716 filed on Aug. 29, 2014, and all the benefits accruing therefrom under 35 U.S.C. §119, the contents of which are incorporated by reference in their entirety.

BACKGROUND

The present disclosure relates to a method of scanning a touch panel and a touch integrated circuit (IC) for performing the same. More particularly, the present disclosure relates to a method of scanning a touch panel to recognize a touch signal by a user and a touch IC for performing the same.

A touch panel may be used as an input device of a smart device that includes a display panel and an application processor. The touch panel may be classified into a resistive type, a capacitive type, or an electromagnetic type and the like.

For example, a touch panel of a mutual capacitance type may detect a touch location by measuring a mutual capacitance varying by the touch of a conductor between a driving line and a sensing line.

The touch panel of the mutual capacitance type may include a plurality of driving lines and a plurality of sensing lines crossing the driving lines. When driving signals are sequentially supplied to the driving lines, a mutual capacitance generated by the applying of the driving signals may be detected from the sensing lines. The driving lines and the sensing lines may be connected to a touch IC, and the touch IC may supply the driving signals and obtain sensing signals from the sensing lines.

The touch IC may sequentially supply a driving signal to the driving lines, and sensing signals may be acquired from the sensing lines while the driving signal is supplied to each of the driving lines. At this time, a driving time indicates the amount of time that the driving signal is supplied to one driving line, and a frame time indicates the time required to acquire sensing signals constituting one frame. That is, the frame time is calculated by multiplying the driving time by the number of the driving lines.

Meanwhile, when the driving time is increased, the noise of the sensing signals may be decreased, but the frame time may be increased. As a result, the response time of the touch panel may be increased, and further the response characteristics of the touch panel may be deteriorated. On the contrary, when the driving time is decreased, the frame time and the response time may be shortened. However, the noise of the sensing signals may be increased, and thus it may be difficult to accurately recognize a touch by a user.

SUMMARY

The present disclosure provides a method of scanning a touch panel capable of improving the response characteristics and the sensing sensitivity of the touch panel, and a touch IC for performing the same.

In accordance with an aspect of the claimed invention, a method of scanning a touch panel may include simultaneously supplying a first driving signal having a first phase and a second driving signal having a second phase to a first driving line and a second driving line of the touch panel, respectively, detecting a sensing signal from a sensing line crossing the first driving line and the second driving line, and acquiring a first scanning signal corresponding to the first driving line and a second scanning signal corresponding to the second driving line from the sensing signal.

In accordance with some exemplary embodiments, the acquiring of the first scanning signal and the second scanning signal may include converting the sensing signal to a digital signal, multiplying the digital signal by a first reference signal having a phase identical to the first driving signal to acquire the first scanning signal, and multiplying the digital signal by a second reference signal having a phase identical to the second driving signal to acquire the second scanning signal.

In accordance with some exemplary embodiments, the first and second driving signals may have a sine wave form or a cosine wave form, respectively.

In accordance with some exemplary embodiments, the touch panel may include a plurality of sensing lines, and a plurality of first scanning signals and a plurality of second scanning signals may be acquired from the plurality of sensing lines.

In accordance with some exemplary embodiments, the plurality of first scanning signals and the plurality of second scanning signals may be simultaneously acquired.

In accordance with some exemplary embodiments, the method may further include integrating the first scanning signal and the second scanning signal to acquire a first integration value and a second integration value, respectively, and storing the first integration value and the second integration value.

In accordance with some exemplary embodiments, the method may further include simultaneously supplying the second driving signal and the first driving signal to the first driving line and the second driving line, respectively, detecting a second sensing signal from the sensing line, acquiring a third scanning signal corresponding to the first driving line and a fourth scanning signal corresponding to the second driving line from the second sensing signal, integrating the third scanning signal and the fourth scanning signal to acquire a third integration value and a fourth integration value, respectively, and storing the third integration value and the fourth integration value.

In accordance with some exemplary embodiments, the method may further include calculating a first average value of the first and third integration values and a second average value of the second and fourth integration values.

In accordance with another aspect of the claimed invention, a touch IC may include a touch driver configured to simultaneously supply a first driving signal having a first phase and a second driving signal having a second phase to a first driving line and a second driving line of a touch panel, respectively, a signal processing unit configured to detect a sensing signal from a sensing line crossing the first driving line and the second driving line and acquire a first scanning signal corresponding to the first driving line and a second scanning signal corresponding to the second driving line from the sensing signal, and a control unit configured to control operations of the touch driver and the signal processing unit.

In accordance with some exemplary embodiments, the signal processing unit may include an analog front end (AFE) configured to receive the sensing signal and convert the sensing signal to a digital signal, a first signal generator configured to generate a first reference signal having a phase identical to the first driving signal, a first calculator configured to multiply the digital signal by the first reference signal so as to acquire the first scanning signal, a second signal generator configured to generate a second reference signal having a phase identical to the second driving signal, and a second calculator configured to multiply the digital signal by the second reference signal so as to acquire the second scanning signal.

In accordance with some exemplary embodiments, the signal processing unit may include a first integrator configured to integrate the first scanning signal so as to acquire a first integration value, and a second integrator configured to integrate the second scanning signal so as to acquire a second integration value.

In accordance with some exemplary embodiments, the touch IC may further include a frame buffer memory configured to store the first integration value and the second integration value.

In accordance with some exemplary embodiments, the touch driver may simultaneously supply the second driving signal and the first driving signal to the first driving line and the second driving line, respectively, and the signal processing unit detects a second sensing signal from the sensing line, acquires a third scanning signal corresponding to the first driving line and a fourth scanning signal corresponding to the second driving line from the second sensing signal, and integrates the third scanning signal and the fourth scanning signal so as to acquire a third integration value and a fourth integration value, respectively.

In accordance with some exemplary embodiments, the control unit may include a filter configured to reduce errors of the first, second, third and fourth integration values.

In accordance with some exemplary embodiments, the control unit may include a finite impulse response (FIR) filter configured to calculate a first average value of the first and third integration values and a second average value of the second and fourth integration values.

In accordance with some exemplary embodiments, the first and second driving signals may have a sine wave form or a cosine wave form, respectively.

In accordance with some exemplary embodiments, the touch panel may include a plurality of sensing lines, and the signal processing unit may include a plurality of sensing channels configured to acquire a plurality of first scanning signals and a plurality of second scanning signals from the plurality of sensing lines.

In accordance with some exemplary embodiments, the plurality of first scanning signals and the plurality of second scanning signals are simultaneously acquired.

BRIEF DESCRIPTION OF THE DRAWINGS

Exemplary embodiments can be understood in more detail from the following description taken in conjunction with the accompanying drawings, in which.

Figure 1:
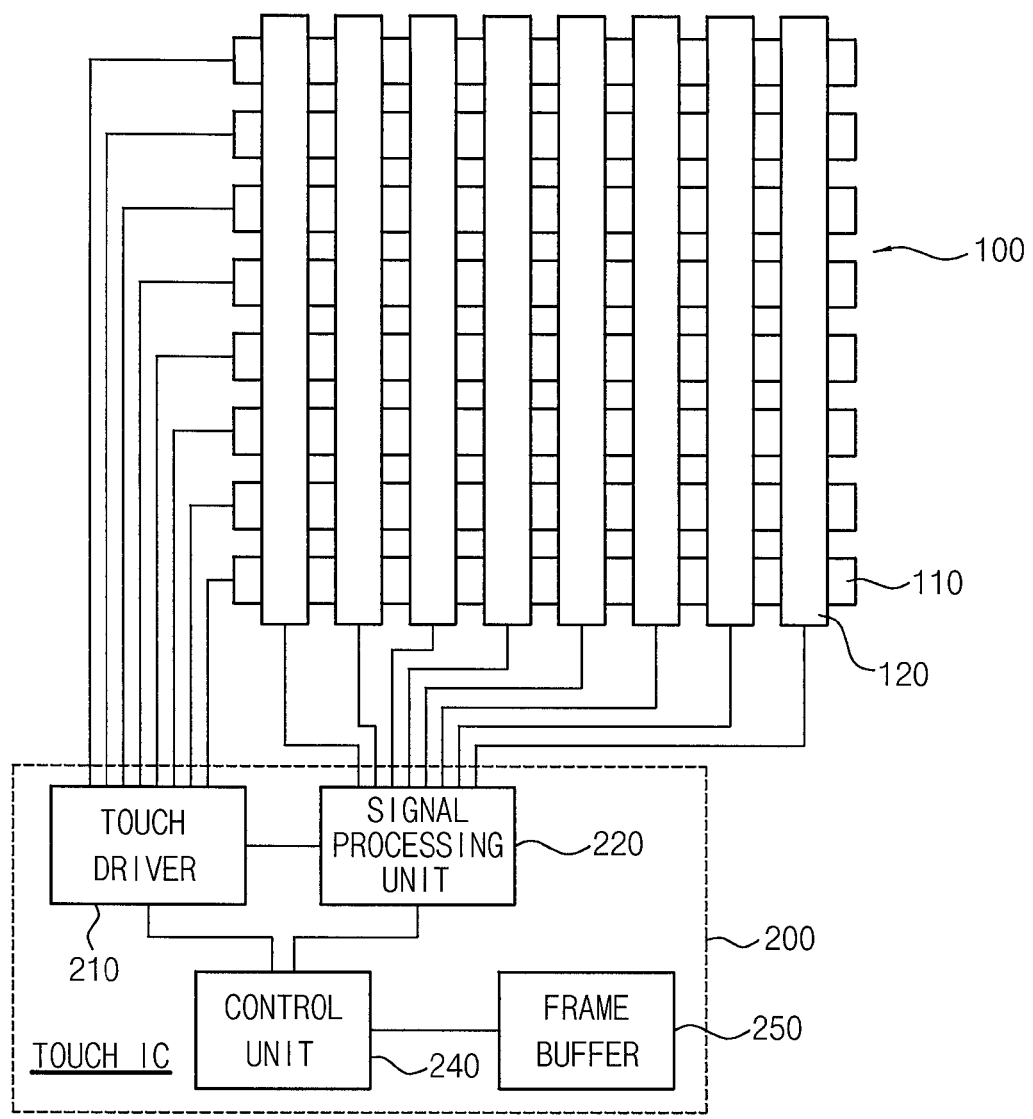
FIG. 1 is a schematic view illustrating a touch IC for performing a method of scanning a touch panel in accordance with an exemplary embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF EMBODIMENTS

The claimed invention is described below in detail with reference to the accompanying drawings that show embodiments. However, the claimed invention does not need to be configured as represented in embodiments to be described below and may be implemented in many different forms. When it is described that a component is arranged on or connected to another component or layer, the former may also be arranged directly on or connected directly to the latter or other components or layers may also be in between. On the other hand, when it is described that a component is arranged directly on or connected directly to another component, there may be no component in between. Although the terms 'a first' and 'a second' may be used in order to describe various items such as various components, compositions, regions, layers and/or parts, the items are not limited by these terms.

The special terms used herein are only used for the purpose of describing particular embodiments and not intended to limit the claimed invention. Also, all terms including technological and scientific terms have the same meanings as those that may be understood by a person skilled in the art to which the claimed invention pertains, unless otherwise specified. The terms such as those defined in ordinary dictionaries are construed as having the same meanings in contexts of the related art and the claimed invention and not construed as an explicit intuition ideally or excessively unless clearly specified.

Embodiments of the claimed invention are described with reference to schematic diagrams of the ideal embodiments of the claimed invention. Thus, changes in shapes of the diagrams such as changes in manufacturing methods and/or tolerances are may be sufficiently predicted. Thus, the embodiments of the claimed invention are not described to be limited to particular shapes of illustrated regions but include the differences in shapes, and regions shown in the drawings are entirely schematic and their shapes are not intended to describe the accurate shape of a region nor limit the scope of the claimed invention.

FIG. 1 is a schematic view illustrating a touch IC for performing a method of scanning a touch panel in accordance with an exemplary embodiment.

Referring to FIG. 1, a method of scanning a touch panel in accordance with an exemplary embodiment may be used to recognize a touch signal from the touch panel 100.

The touch panel 100 may include a plurality of driving lines 110 and a plurality of sensing lines 120 crossing the driving lines 110. For example, a touch panel of a mutual capacitance type may be used as the touch panel 110. The sensing lines 120 may be disposed over the driving lines 110, and an insulating layer (not shown) may be disposed between the driving lines 110 and the sensing lines 120.

A touch IC 200 may include a touch driver 210 configured to supply driving signals to the driving lines 110 of the touch panel 100, a signal processing unit 220 configured to receive electrical signals, i.e., sensing signals from the sensing lines 120 of the touch panel 100, and a control unit 240 configured to control operations of the touch driver 210 and the signal processing unit 220.

Figure 2:
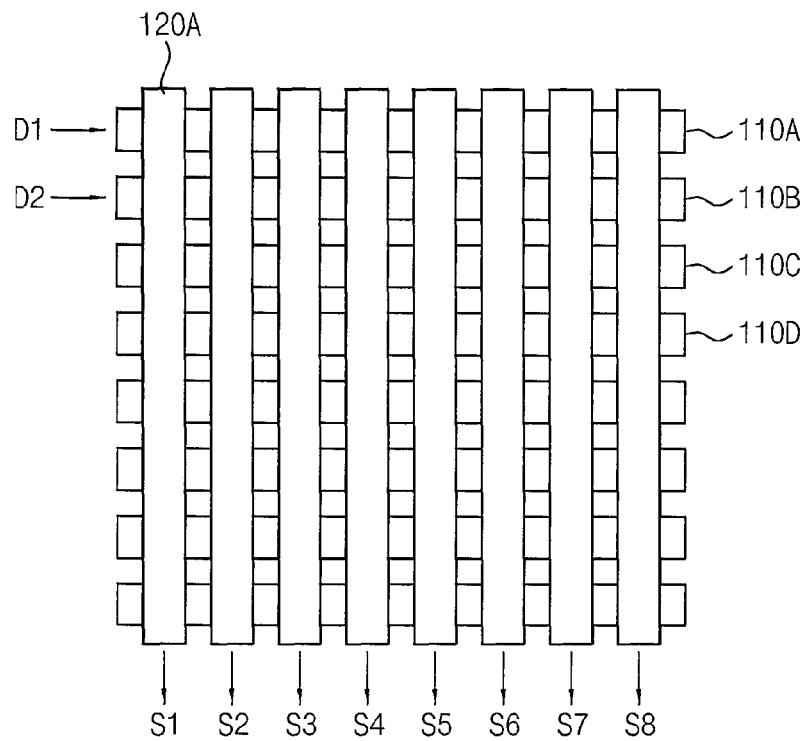
FIG. 2 is a schematic view illustrating a first driving signal and a second driving signal supplied to the driving lines.
Figure 3:
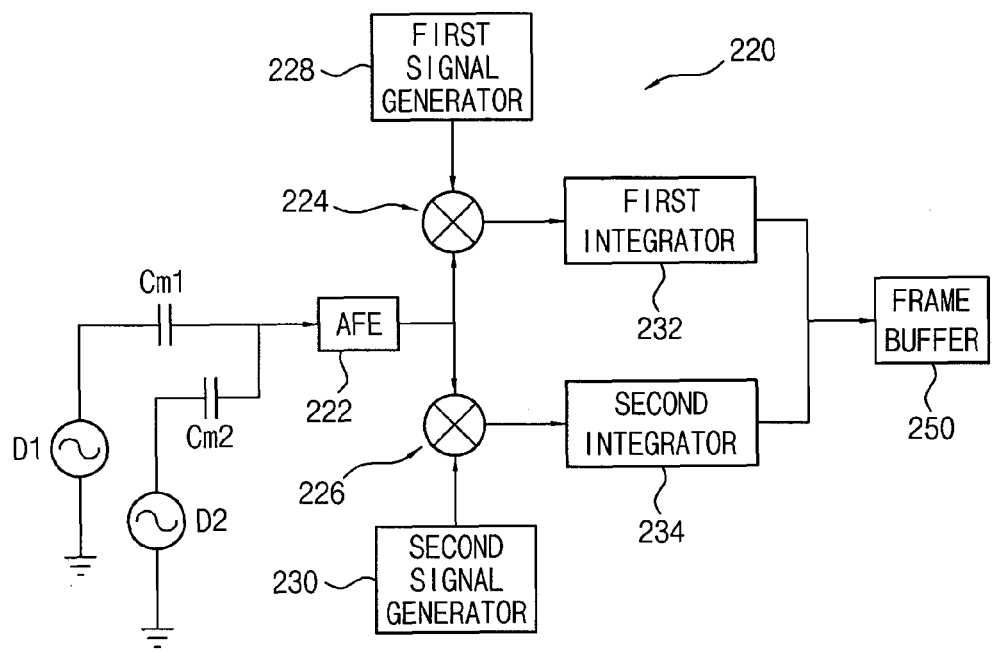
FIG. 3 is a schematic view illustrating the signal processing unit as shown in FIG. 1.

FIG. 2 is a schematic view illustrating a first driving signal and a second driving signal supplied to the driving lines, and FIG. 3 is a schematic view illustrating the signal processing unit as shown in FIG. 1.

Referring to FIG. 2, in accordance with an exemplary embodiment, the touch driver 210 (FIG. 1) may simultaneously supply a first driving signal and a second driving signal to two driving lines 110, respectively. For example, a first driving signal D1 having a first phase and a second driving signal D2 having a second phase different from the first phase may be simultaneously supplied to a first driving line 110A and a second driving line 110B, respectively. The signal processing unit 220 may receive sensing signals S1-S8 from the sensing lines 120 (FIG. 1) while the first and second driving signals D1 and D2 are supplied to the first and second driving lines 110A and 110B.

Then, the touch driver 210 may simultaneously supply the first and second driving signals D1 and D2 to a third driving line 110C and a fourth driving line 110D, respectively, and further the signal processing unit 220 may receive sensing signals S1-S8 from the sensing lines 120 while the first and second driving signals D1 and D2 are supplied to the third and fourth driving lines 110C and 110D.

The touch driver 210 may sequentially supply the first and second driving signals D1 and D2 to all driving lines 110 by using the method as described above, and the signal processing unit 220 may receive sensing signals S1-S8 corresponding to the driving lines 110 from the sensing lines 120.

In accordance with an exemplary embodiment, a phase difference between the first and second driving signals D1 and D2 may be about 90 degrees. For example, the touch driver 210 may supply a first driving signal D1 having a sine wave form to odd driving lines 110A and 110C and supply a second driving signal D2 having a cosine wave form to even driving lines 110B and 110D.

Alternatively, the touch driver 210 may supply the first driving signal D1 to the first to fourth driving lines 110A, 110B, 110C and 110D and supply the second driving signal D2 to fifth to eighth driving lines 110E, 110F, 110G, and 110H.

The signal processing unit 220 may include a plurality of sensing channels (not shown) connected with the sensing lines 120, respectively. For example, the signal processing unit 220 may include eight sensing channels connected with eight sensing lines 120, respectively.

When the first and second driving signals D1 and D2 are supplied to the first and second driving lines 110A and 110B, respectively, and the signal processing unit 220 may detect the sensing signals S1-S8 and acquire first scanning signals corresponding to the first driving line 110A and second scanning signals corresponding to the second driving line 110B from the sensing signals S1-S8.

For example, the signal processing unit 220 may detect a sensing signal S1 from a first sensing line 120A. Particularly, the sensing signal S1 may include a first signal portion corresponding to the first driving line 110A and a second signal portion corresponding to the second driving line 110B. The signal processing unit 220 may include elements for acquiring the first and second signal portions from the sensing signal S1.

Referring to FIG. 3, the signal processing unit 220 may include an analog front end (AFE) 222 configured to convert the sensing signals received from the sensing lines 120 to digital signals and first and second calculators 224 and 226 configured to acquire the scanning signals from the digital signals.

When the first driving signal D1 and the second driving signal D2 are supplied to the first driving line 110A and the second driving line 110B, respectively, and the sensing signal S1 may be generated by a mutual capacitance Cm1 between the first driving line 110A and the first sensing line 120A and a mutual capacitance Cm2 between the second driving line 110B and the first sensing line 120A. The AFE 222 may detect the sensing signal S1 and convert the sensing signal S1 to a digital signal.

The first calculator 224 may multiply the digital signal converted by the AFE 222 by a first reference signal having a phase identical to the first driving signal D1 so as to acquire the first scanning signal. The second calculator 226 may multiply the digital signal converted by the AFE 222 by a second reference signal having a phase identical to the second driving signal D2 so as to acquire the second scanning signal.

The signal processing unit 220 may include a first signal generator 228 configured to generate the first reference signal and a second signal generator 230 configured to generate the second reference signal. For example, when the first driving signal D1 has a sine wave form, the first signal generator 228 may generate a sine signal, and when the second driving signal D2 has a cosine wave form, the second signal generator 230 may generate a cosine signal.

The signal processing unit 220 may include a first integrator 232 configured to integrate the first scanning signal so as to acquire a first integration value and a second integrator 234 configured to integrate the second scanning signal so as to acquire a second integration value.

The touch IC 200 may include a frame buffer memory 250 for storing the first and second integration values.

The signal processing unit 220 may process the plurality of sensing signals received from the plurality of sensing lines 120 so as to acquire a plurality of first integration values corresponding to the first driving line 110A and a plurality of second integration values corresponding to the second driving line 110B. The first and second integration values may be stored in the frame buffer memory 250. Particularly, the signal processing unit 220 may simultaneously detect the plurality of sensing signals by using the sensing channels and further simultaneously acquire the first and second integration values.

The touch driver 210 may simultaneously supply the first driving signal D1 and the second driving signal D2 to the third driving line 110C and the fourth driving line 110D, respectively, and the signal processing unit 220 may detect sensing signals corresponding to the third and fourth driving lines 110C and 110D from the sensing lines 120. Further, the signal processing unit 220 may acquire a third scanning signals corresponding to the third driving line 110C and a fourth scanning signals corresponding to the fourth driving line 110D from the sensing signals, and then acquire third and fourth integration values from the third and fourth scanning signals.

The touch IC 200 may acquire integration values corresponding to all driving lines 110 by using the method as described above, and the integration values may be stored in the frame buffer memory 250. The integration values may constitute one frame data, and the control unit 240 may repeatedly acquire the frame data by using the method as described above. The control unit 240 may recognize a touch signal or a gesture input onto the touch panel 100 from the frame data. The frame data may have a matrix form corresponding to crossing points of the driving lines 110 and the sensing lines 120.

Meanwhile, when the first driving signal D1 having a sine wave form and the second driving signal D2 having a cosine wave form are used, the reliability of the frame data may be deteriorated by a phase error. Particularly, the first driving signal D1 having the sine wave form may cause a relatively large data error in comparison with the second driving signal D2 having the cosine wave form. For example, when the second driving signal D2 has one degree of phase error, the second integration values may be increased by approximately 0.015 percent. However, the first driving signal D1 has one degree of phase error, the first integration values may be decreased by approximately 1.745 percent.

In accordance with an exemplary embodiment, the touch IC 200 may include a filter (not shown) configured to reduce or remove the data error caused by the phase error. Particularly, the touch IC 200 may include a finite impulse response (FIR) filter configured to reduce or remove the errors of the integration values caused by the phase error of the driving signals.

When the filter is used, a first frame data and a second frame data may be acquired by using driving signals different from each other. For example, to acquire the first frame data, a first driving signal D1 having a first phase may be supplied to the odd driving lines 110A and 110C, and a second driving signal D2 having a second phase may be supplied to the even driving lines 110B and 110D. Then, to acquire the second frame data, the second driving signal D2 may be supplied to the odd driving lines 110A and 110C, and the first driving signal D2 may be supplied to the even driving lines 110B and 110D.

A method of acquiring frame data using the filter will be described in minute detail as follows.

A first driving signal D1 having a first phase and a second driving signal D2 having a second phase are simultaneously supplied to the first driving line 110A and the second driving line 110B, respectively, and sensing signals are received from the sensing lines 120. For example, the first driving signal D1 may have a sine wave form, and the second driving signal D2 may have a cosine wave form.

First scanning signals corresponding to the first driving line 110A and second scanning signals corresponding to the second driving line 110B are acquired by multiplying the sensing signals by a first reference signal having the first phase and a second reference signal having the second phase, respectively. For example, the first scanning signals may be acquired by multiplying the sensing signals by a sine signal, and the second scanning signals may be acquired by multiplying the sensing signals by a cosine signal.

The first and second scanning signals are integrated to acquire first and second integration values, respectively, and the first and second integration values are stored in the frame buffer memory 250.

Integration values corresponding to all driving lines 110 may be acquired by using a method as described above, and the integration values may be stored in the frame buffer memory 250. The integration values corresponding to the driving lines 110 may constitute a first preliminary frame data and have a matrix form.

After acquiring the first preliminary frame data, in order to acquire a second preliminary frame data, the second driving signal D2 is supplied to the first driving line 110A, and the first driving signal D1 is supplied to the second driving line 110B.

First scanning signals and second scanning signals are acquired by multiplying sensing signals detected from the sensing lines 120 by the second reference signal and the first reference signal. For example, the first scanning signals may be acquired by multiplying the sensing signals by a cosine signal, and the second scanning signals may be acquired by multiplying the sensing signals by a sine signal.

The first and second scanning signals are integrated to acquire first and second integration values, respectively, and the first and second integration values are stored in the frame buffer memory 250.

Integration values corresponding to all driving lines 110 may be acquired by using a method as described above, and the integration values may be stored in the frame buffer memory 250. The integration values corresponding to the driving lines 110 may constitute the second preliminary frame data and have a matrix form.

Then, average values of the integration values of the first and second preliminary frame data corresponding to each other are calculated. The average values may constitute a first frame data. For example, a first average value corresponding to the first driving line 110A and the first sensing line 120A may be calculated from the first integration value of the first preliminary frame data corresponding to the first driving line 110A and the first sensing line 120A, and the first integration value of the second preliminary frame data corresponding to the first driving line 110A and the first sensing line 120A. Further, a second average value corresponding to the second driving line 110B and the first sensing line 120A may be calculated from the second integration value of the first preliminary frame data corresponding to the second driving line 110B and the first sensing line 120A, and the second integration value of the second preliminary frame data corresponding to the second driving line 110B and the first sensing line 120A.

The step of calculating the first frame data may be performed while a third preliminary frame data is acquired. A second frame data may be calculated from the second preliminary frame data and the third preliminary frame data.

As described above, the first driving signal D1 having the sine wave form and the second driving signal D2 having cosine wave form are alternately supplied to the driving lines 110, and the frame data is acquired by averaging the integration values of the first preliminary frame data and the second preliminary frame data. Thus, the error of the frame data may be sufficiently reduced.

Figure 4:
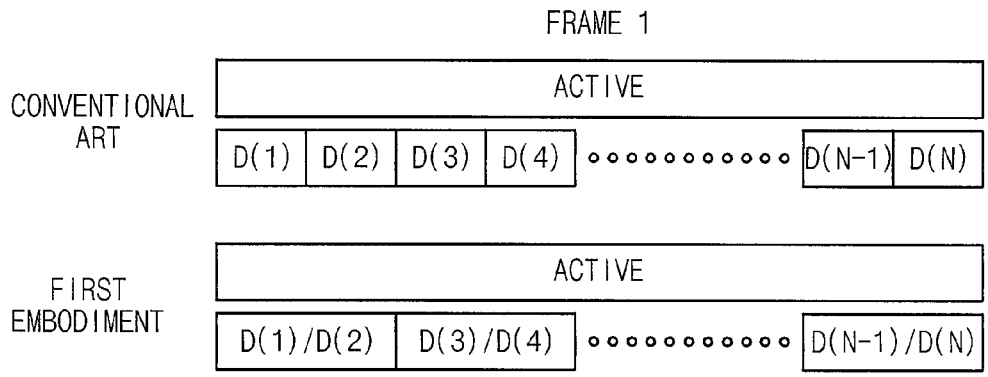
FIG. 4 is a schematic view illustrating the conventional art and a first exemplary embodiment of the claimed invention.

FIG. 4 is a schematic view illustrating the conventional art and a first exemplary embodiment of the claimed invention.

Referring to FIG. 4, when a frame time of the first embodiment is identical to the conventional art, a driving time of the first embodiment may be increased by two times in comparison with the conventional art, which is because the first and second driving signals D1 and D2 are simultaneously supplied to the first and second driving lines, respectively. As a result, the noise of the sensing signals may be sufficiently reduced, and the sensing sensitivity of the touch panel 100 may be sufficiently improved.

Figure 5:
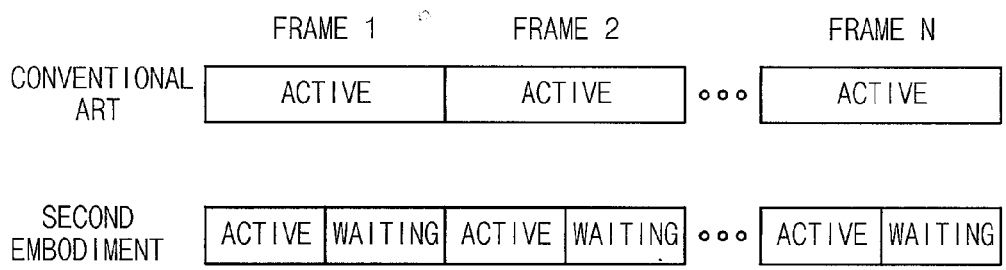
FIG. 5 is a schematic view illustrating the conventional art and a second exemplary embodiment of the claimed invention.

FIG. 5 is a schematic view illustrating the conventional art and a second exemplary embodiment of the claimed invention.

Referring to FIG. 5, a frame time of the second embodiment may sufficiently decrease in comparison with the conventional art. For example, when a driving time of the second embodiment is identical to the conventional art, the frame time of the second embodiment may be decreased by half in comparison with the conventional art, and the remaining time may be used as a waiting time. As a result, the power consumption of the touch panel 100 may be sufficiently reduced.

Figure 6:
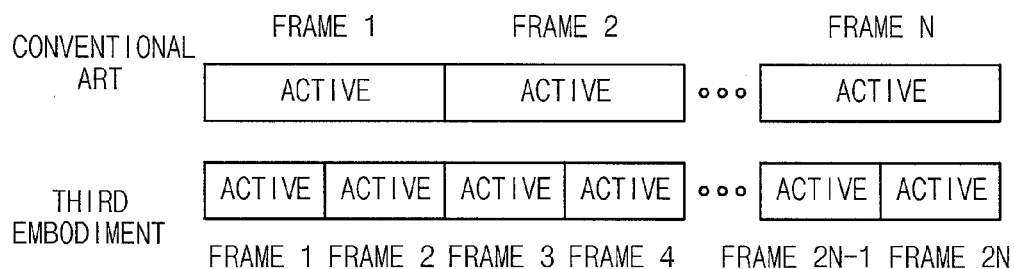
FIG. 6 is a schematic view illustrating the conventional art and a third exemplary embodiment of the claimed invention.

FIG. 6 is a schematic view illustrating the conventional art and a third exemplary embodiment of the claimed invention.

Referring to FIG. 6, a frame time of the third embodiment may be decreased by half in comparison with the conventional art because the first and second driving signals D1 and D2 are simultaneously supplied to the first and second driving lines 110A and 110B, respectively. As a result, the response characteristics of the touch panel 100 may be sufficiently improved.

Figure 7:
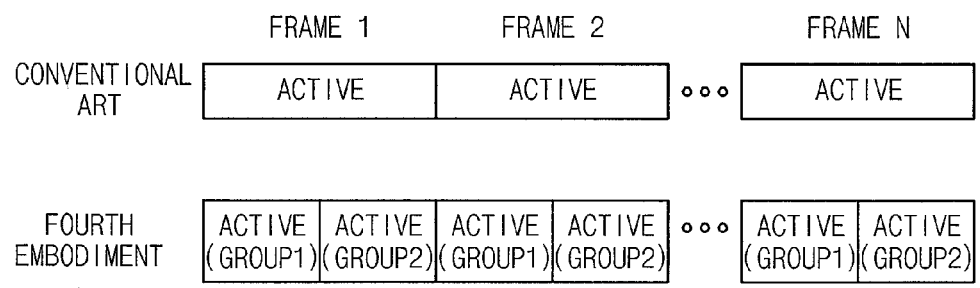
FIG. 7 is a schematic view illustrating the conventional art and a fourth exemplary embodiment of the claimed invention.

FIG. 7 is a schematic view illustrating the conventional art and a fourth exemplary embodiment of the claimed invention.

Referring to FIG. 7, when a frame time of the fourth embodiment is identical to the conventional art, the number of the sensing channels of the signal processing unit 220 may be decreased by half, and thus size and cost of the touch IC 200 may be sufficiently reduced. For example, when the touch panel 100 includes eight sensing lines 120, the sensing lines may be divided into a first group including first to fourth sensing lines and a second group including fifth to eight sensing lines. Then, scanning steps on the first and second groups may be repeatedly performed by using four sensing channels.

In accordance with exemplary embodiments of the claimed invention as described above, the touch IC 200 may simultaneously supply the first and second driving signals D1 and D2 to the first and second driving lines 110A and 110B, respectively, and then detect the sensing signals from the sensing lines 120. Particularly, the first driving signal D1 may have a first phase, and the second driving signal D2 may have a second phase different from the first phase. Further, the touch IC 200 may multiply the sensing signals by the first reference signal having the first phase and the second reference signal having the second phase so as to acquire the first scanning signals and the second scanning signals.

Thus, the sensing sensitivity and the response characteristics of the touch panel 100 may be sufficiently improved. Further, the power consumption of the touch panel 100 may be sufficiently reduced, and the size and cost of the touch IC 200 may be sufficiently reduced.

Although the method of scanning the touch panel and the touch IC for performing the same have been described with reference to the specific embodiments, they are not limited thereto. Therefore, it will be readily understood by those skilled in the art that various modifications and changes can be made thereto without departing from the spirit and scope of the claimed invention.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A method of scanning a touch panel, the method comprising:
   simultaneously supplying a first driving signal having a first phase and a second driving signal having a second phase to a first driving line and a second driving line of the touch panel, respectively;
   detecting a sensing signal from a sensing line crossing the first driving line and the second driving line;
   acquiring a first scanning signal corresponding to the first driving line and a second scanning signal corresponding to the second driving line from the sensing signal;
   integrating the first scanning signal and the second scanning signal to acquire a first integration value and a second integration value, respectively;
   simultaneously supplying the second driving signal and the first driving signal to the first driving line and the second driving line, respectively, after acquiring the first integration value and the second integration value;
   detecting a second sensing signal from the sensing line;
   acquiring a third scanning signal corresponding to the first driving line and a fourth scanning signal corresponding to the second driving line from the second sensing signal; and
   integrating the third scanning signal and the fourth scanning signal to acquire a third integration value and a fourth integration value, respectively.

2. The method of claim 1, wherein the acquiring of the first scanning signal and the second scanning signal comprises:
converting the sensing signal to a digital signal;
multiplying the digital signal by a first reference signal having a phase identical to the first driving signal to acquire the first scanning signal; and
multiplying the digital signal by a second reference signal having a phase identical to the second driving signal to acquire the second scanning signal.

3. The method of claim 1, wherein the first and second driving signals have a sine wave form and a cosine wave form, respectively.

4. The method of claim 1, wherein the touch panel comprises a plurality of sensing lines, and a plurality of first scanning signals and a plurality of second scanning signals are acquired from the plurality of sensing lines.

5. The method of claim 4, wherein the plurality of first scanning signals and the plurality of second scanning signals are simultaneously acquired.

6. The method of claim 1, further comprising:
storing the first integration value and the second integration value; and
storing the third integration value and the fourth integration value.

7. The method of claim 1, further comprising:
calculating a first average value of the first and third integration values and a second average value of the second and fourth integration values.

8. A touch integrated circuit (IC) comprising:
a touch driver connected with a first driving line and a second driving line of a touch panel, respectively;
a signal processing unit connected with a sensing line crossing the first driving line and the second driving line; and
a control unit configured to control operations of the touch driver and the signal processing unit, wherein
the touch driver is configured to simultaneously supply a first driving signal having a first phase and a second driving signal having a second phase to the first driving line and the second driving line, respectively;
the signal processing unit is configured to detect a first sensing signal from the sensing line, acquire a first scanning signal corresponding to the first driving line and a second scanning signal corresponding to the second driving line from the first sensing signal, and integrate the first scanning signal and the second scanning signal so as to acquire a first integration value and a second integration value, respectively;
the touch driver is configured to simultaneously supply the second driving signal and the first driving signal to the first driving line and the second driving line, respectively, after acquiring the first integration value and the second integration value; and
the signal processing unit is configured to detect a second sensing signal from the sensing line, acquire a third scanning signal corresponding to the first driving line and a fourth scanning signal corresponding to the second driving line from the second sensing signal, and integrate the third scanning signal and the fourth scanning signal so as to acquire a third integration value and a fourth integration value, respectively.

9. The touch IC of claim 8, wherein the signal processing unit comprises:
an analog front end (AFE) configured to receive the first and second sensing signals and convert the first and second sensing signals to first and second digital signals;
a first signal generator configured to generate a first reference signal having a phase identical to the first driving signal;
a second signal generator configured to generate a second reference signal having a phase identical to the second driving signal;
a first calculator configured to multiply the first digital signal by the first reference signal so as to acquire the first scanning signal and multiply the second digital signal by the second reference signal so as to acquire the third scanning signal; and
a second calculator configured to multiply the first digital signal by the second reference signal so as to acquire the second scanning signal and multiply the second digital signal by the first reference signal so as to acquire the fourth scanning signal.

10. The touch IC of claim 8, wherein the signal processing unit comprises:
a first integrator configured to integrate the first scanning signal and the third scanning signal so as to acquire the first integration value and the third integration value; and
a second integrator configured to integrate the second scanning signal and the fourth scanning signal so as to acquire the second integration value and the fourth integration value.

11. The touch IC of claim 10, further comprising:
a frame buffer memory configured to store the first integration value, the second integration value, the third integration value, and the fourth integration value.

12. The touch IC of claim 8, wherein the control unit comprises a filter configured to reduce errors of the first, second, third and fourth integration values.

13. The touch IC of claim 8, wherein the control unit comprises a finite impulse response (FIR) filter configured to calculate a first average value of the first and third integration values and a second average value of the second and fourth integration values.

14. The touch IC of claim 8, wherein the first and second driving signals have a sine wave form or a cosine wave form, respectively.

15. The touch IC of claim 8, wherein the touch panel comprises a plurality of sensing lines, and the signal processing unit comprises a plurality of sensing channels configured to acquire a plurality of first scanning signals and a plurality of second scanning signals from the plurality of sensing lines.

16. The touch IC of claim 15, wherein the plurality of first scanning signals and the plurality of second scanning signals are simultaneously acquired.

* * * * *